United States Patent [19]

Barazeche et al.

[11] Patent Number: 4,645,884

[45] Date of Patent: Feb. 24, 1987

[54] METHOD AND APPARATUS FOR INITIALIZING FILTER COEFFICIENTS IN AN ECHO CANCELLER

[75] Inventors: Bahman Barazeche, Paris; Roger P. J. Alexis, Neuilly-sur-Seine; Loïc B. Y. Guidoux, Garancieres, all of France

[73] Assignee: Telecommunications Radioelectriques et Telephoniques, Paris, France

[21] Appl. No.: 574,805

[22] Filed: Jan. 30, 1984

[30] Foreign Application Priority Data

Jan. 31, 1983 [FR] France ................... 83 01457

[51] Int. Cl.$^4$ .............................................. H04B 3/20
[52] U.S. Cl. ......................................... 379;406; 370/32
[58] Field of Search .............. 179/170.2, 170.6, 170.8; 370/32

[56] References Cited

U.S. PATENT DOCUMENTS

| | | | |
|---|---|---|---|
| 3,588,385 | 6/1971 | Moye | 179/170.2 |
| 4,144,417 | 3/1979 | Oshima et al. | 179/170.2 |
| 4,162,378 | 7/1979 | Baudoux et al. | 179/170.2 |
| 4,355,214 | 10/1982 | Lévy et al. | 170/170.2 |
| 4,370,741 | 1/1983 | Haass | 370/24 |
| 4,577,309 | 3/1986 | Barazeche et al. | 370/32 |

FOREIGN PATENT DOCUMENTS 2008903 6/1977 United Kingdom ............ 179/170.2

OTHER PUBLICATIONS

"A Passband Data-Driven Echo Canceller for Full-Duplex Transmission on Two-Wire Circuits", Stephen Weinstein, IEEE Transactions on Communications vol. Com-25, No. 7, Jul. 1977, pp. 654–666.

Primary Examiner—Thomas W. Brown
Assistant Examiner—R. Vaas
Attorney, Agent, or Firm—William J. Streeter; Leroy Eason

[57] ABSTRACT

The filter coefficients of an echo cancelling arrangement having a near echo canceller and a distant echo canceller are initialized in accordance with a method and apparatus wherein the following steps are performed:

transmission of at least two training sequences each comprising a pair of complementary S and C sequences having autocorrelation functions such that, if added, their sidelobes cancel, each S and C sequence being followed by a variable time interval $\Delta$, determined as a function of the measured distant echo delay $\tau$ so that a distant echo produced in response to a training sequence occurs immediately after the near echo produced in response to by a following training sequence;

after the first training sequence transmitted, calculation of correlation signals giving the correlation between the received signal and reference signals derived from an S sequence and a C sequence respectively during the first half and the second half of a training sequence of a duration T;

application of a delay T/2 to the correlation signal formed on the basis of the S sequence;

production of a sum signal of said delayed correlation signal and the correlation signal formed on the basis of the C sequence; and on the basis of said sum signal, extraction of the coefficients of the echo cancellers during determined time windows.

6 Claims, 9 Drawing Figures

METHOD AND APPARATUS FOR INITIALIZING FILTER COEFFICIENTS IN AN ECHO CANCELLER

BACKGROUND OF THE INVENTION

1. Field of the Invention

The invention relates to a method for initializing filter coefficients, used in an echo-cancelling arrangement incorporated in a transceiver equipment to cancel an echo signal occurring in the receive path in response to a signal applied to the transmit path and consisting of a substantially undelayed near echo and a delayed distant echo, said echo-cancelling arrangement operating at a given sample rate and comprising a near echo canceller receiving a signal D subjected to the phase variations of the transmit carrier and a distant echo canceller receiving the said signal D subjected additionally to a delay which is substantially equal to the measured distant echo delay $\tau$ end echo, this method being intended for the initialization of the filter coefficients of the near and distant echo cancellers.

2. Description of the Prior Art

It is known that echo cancellers are adaptive devices which are formed with the aid of filters having adjustable coefficients and which are incorporated in data-transmission modems connected to a two-way transmission circuit in order to cancel automatically undesirable echoes occurring in the one-way receive path in response to the signal applied to the one-way transmit path. Conventional echo cancellers are generally designed to cancel echo signals which are not delayed or relatively little delayed, occurring on national and international terrestrial circuits.

However, international communications are being increasingly conducted via communication satellites. In a circuit of this kind, including a satellite link between two radio-relay stations, there may be produced in the receive path of a modem a near echo which is not or little delayed and is generated in the part of the circuit preceding satellite link, as well as a distant echo which is generated in the part of the circuit after the satellite link and which is therefore subject to a considerable delay $\tau$, depending particularly on the wave-propagation time in the satellite link. Since the satellite used may or may not be geostationary and since the terrestrial circuit may differ according to the connections, it can be estimated that in the international switched network the delay $\tau$ of the distant echo may assume values ranging between approximately 220 and 630 ms.

To cancel the echo signal consisting of a near echo and a distant echo, which each have a relatively short duration of the order of 10 ms or several tens of ms but which are separated by a large time interval of the order of the delay $\tau$, it is an advantage to use the echo-cancelling arrangement having the configuration described above and known from the article by Stephen B. Weinstein, entitled "A Passband Data Driven Echo Canceller for Full Duplex Transmission on Two-Wire Circuits", and published in the journal IEEE Transactions on Communications, Vol. COM-25, No. 7, July 1977, pp. 654–666. This configuration comprises an adaptive transversal filter, which receives a signal from the transmit path directly and which provides a copy of the near echo when its coefficients are suitably adjusted, and another adaptive transversal filter, which receives the signal from the transmit path subject to a delay equal to the measured distant echo delay and which delivers a copy of the distant echo when its coefficients are suitably adjusted. By subtracting from the received signal the sum of the signals leaving the two filters, the near and distant echoes in the receive path are cancelled. This configuration, which necessitates a, at least rough, previous measurement of the delay $\tau$ of the distant echo, has the advantage of using adaptive filters whose complexity is not unreasonable.

For adjustment of the coefficients of the two adaptive filters after measurement of the delay $\tau$ of the distant echo, the article by Weinstein referred to above suggests using the gradient algorithm, even during a training period preceding the full duplex transmission of the useful data. With this algorithm the coefficients are adjusted iteratively and tend asymptotically towards their optimum values, leading to a somewhat slow convergence of the two echo cancellers.

SUMMARY OF THE INVENTION

The present invention has for its object to provide a method for the rapid aquisition of the filter coefficients of the near echo canceller and the distant echo canceller, after previous measurement of the distant echo delay time $\tau$ which may be effected by any desired method, e.g. that described in the previously mentioned article by Weinstein or that described in the applicants' copending U.S. patent application Ser. No. 562,612, filed Dec. 19, 1983 now U.S. Pat. No. 4,577,309.

The invention is based on the idea of generating echoes with the aid of complementary "Golay" sequences and each followed by a time interval $\Delta$ controlled as a function of the measured delay $\tau$. These complementary sequences, described in an article by Golay ("Complementary series"; IRE Transactions, Vol. IT-17, April 1961, pp. 82–87), have aperiodic autocorrelation functions such that, if added, the side lobes of these functions cancel. The time interval $\Delta$ is controlled with the aid of the delay $\tau$ in such a way that the near and distant echoes are produced within predetermined time intervals, always separate and continguous, so as to permit, by calculation of the correlation between the transmitted sequences and the received signal, determination of the filter coefficients of the two echo cancellers.

The method according to the invention is characterized in that it comprises at least the following steps:

(a) application to the transmit path of a training signal consisting of at least two consecutive training sequences each comprising a pair of complementary sequences S and C of a same duration d, having aperiodic autocorrelation functions whose main lobes have the same sign and the sidelobes have substantially the same absolute value and opposite signs, each S and C sequence being followed by a time interval of a variable duration $\Delta$, determined as a function of the measured delay $\tau$ so that the distant echo produced in response to an S or C sequence in each training sequence appears within a predetermined time interval of a following training sequence, immediately after the time interval for the appearance of the near echo produced in response to the S or C sequence of the said following training sequence;

(b) during the duration of each training sequence transmitted after the first sequence,
calculation of correlation signals giving the correlation between a signal derived from the received signal and sampled at the same sample rate and reference signals constituted respectively, during the duration of an S sequence and the following duration Δ, by the conjugate value of the said signal D applied to the echo cancellers during a sequence S and, during the duration of a C sequence and the following duration Δ, by the conjugate value of the said signal D applied to the echo cancellers during a C sequence, application of a delay d+Δ to the correlation signal formed during the duration of an S sequence and the following duration Δ, production of a sum signal of the said delayed correlation signal and the correlation signal formed during the duration of a C sequence and the following duration Δ; and (c) routing of the said sum signal to the near echo canceller and then to the distant echo canceller during two consecutive time intervals following a C sequence and during which this sum signal constitutes in series form the coefficients of the near echo canceller and the coefficients of the distant echo canceller.

In communication systems including satellite links, once a connection has been established, it is generally not permissible to have periods of silence of a duration Δ which may exceed hundreds of ms. During these time intervals Δ, therefore, it is necessary to transmit fill-in signals, while at the same time ensuring that these fill-in signals do not produce parasitic signals during the time intervals in which the coefficients of the echo cancellers are being formed. To avoid these parasitic signals, the time intervals Δ in the transmitted training sequences comprise, in one variant of the method according to the invention, fill-in signals such that in two consecutive training sequences fill-in signals A and $\bar{A}$ are used during the time intervals Δ following the two S sequences and fill-in signals B and $\bar{B}$ during the time intervals Δ following the two C sequences, these fill-in signals being such that $A+\bar{A}=0$ and $B+\bar{B}=0$. A sufficient number of training sequences is transmitted to enable the sum signals of the correlation signals to be calculated during the duration of an even number of transmitted training sequences, and such sum signals, derived twice the duration of a training sequence, are accumulated to form a resulting sum signal which is routed to the near echo canceller and then to the distant echo canceller and represents the coefficients of these echo cancellers.

Features of the invention will be more fully appreciated from the following description of an examplary embodiment when considered in conjunction with the accompanying drawing.

DESCRIPTION OF THE PREFERRED EMBODIMENT

Figure 1:
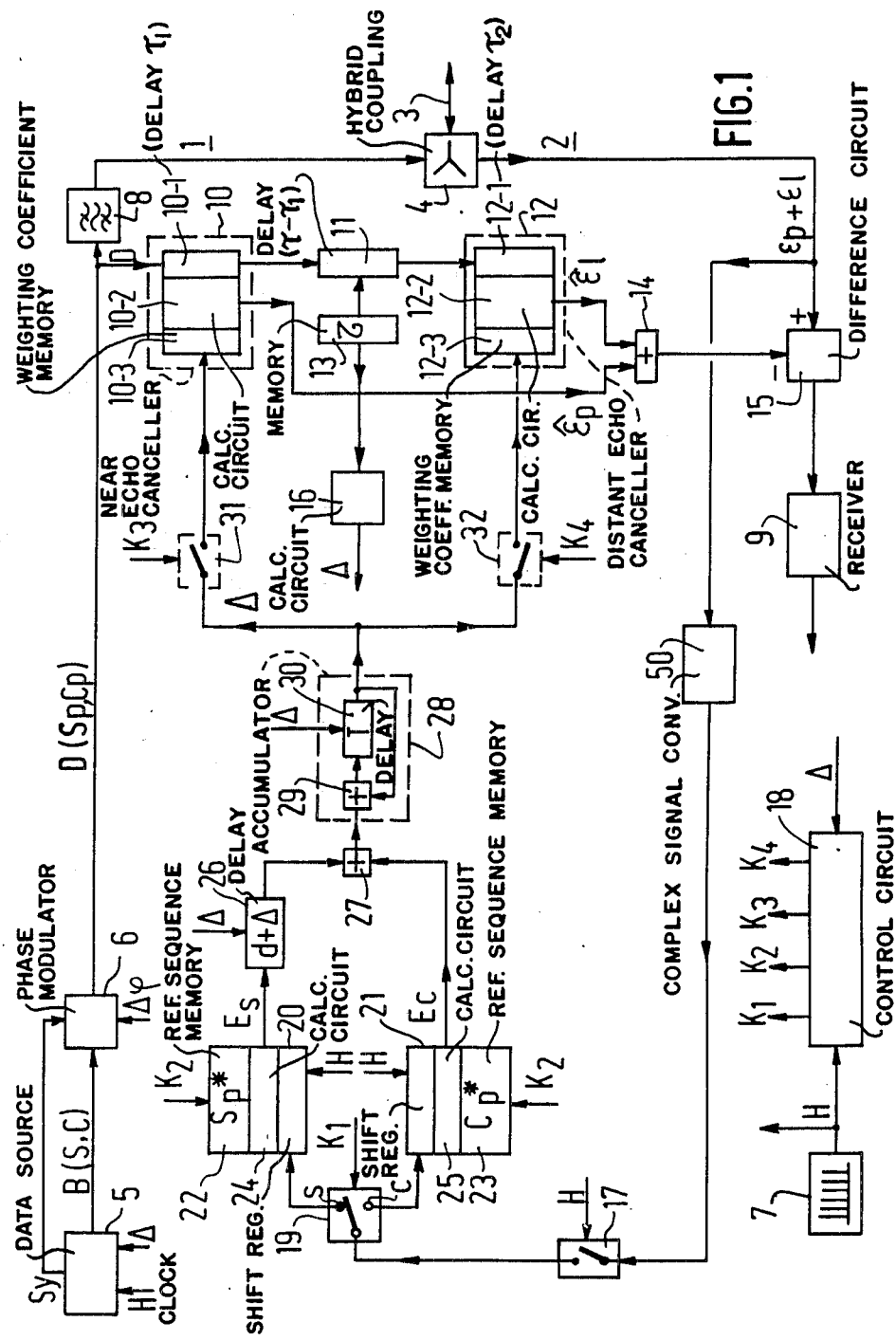
FIG. 1 shows the diagram of a modem incorporating near and distant echo cancellers and the coefficient-initializing apparatus for carrying out the method according to the invention.

The modem provided with an echo-cancelling arrangement and shown in FIG. 1 comprises a transmit path 1 and a receive path 2 coupled to a two-way transmission path via a (hybrid) coupling circuit 4.

The transmit path 1 is connected to a data source 5 which provides a baseband signal B in which the data may change value at a clock rate H supplied by a clock generator 7. It will be assumed that phase modulation, if necesary combined with amplitude modulation, is used in the modem. In the case of two-state (0°–180°) phase modulation, the baseband signal B is a real signal. In the case of four- or eight-state modulation, signal B is a complex signal which undergoes at each period 1/H phase jumps corresponding to the data to be transmitted. Signal B is applied to a phase modulator circuit 6 in which its phase is incremented at each period 1/H by the phase variation Δφ (during this period 1/H) of the carrier used for transmission. In these practical cases of modulation, the signal D supplied by circuit 6 is complex, even in the event that the baseband signal B is real, since the latter has been subject to the phase variations of the carrier. The complex signal D is applied to a band-pass filter 8 for complex signals whose passband is centred on the frequency of the carrier used for transmission. Filter 8 thus supplies the analog modulated carrier signal which is applied to the transmit access of coupling circuit 4. The modulation rate of the carrier is determined by the clock frequency H. In the case of, for example, a standardised modem using eight-phase modulation, the modulation rate is 1600 Baud and the frequency of the carrier is 1800 Hz; with these values the complex signal D may assume any phase of the eight multiples of π/4 between 0 and 7π/4.

At the receive access of coupling circuit 4 there should appear only the carrier signal modulated with data in a remote modem, transmitted over transmission path 3 and intended for processing in a receiver 9, whose function is to restore the transmitted data. In fact, when a useful signal is transmitted in the direction towards the remote modem via transmit path 1, unwanted echo signals produced particularly in the two-wire/four-wire coupling circuits of the transmission path may appear at the receive access of coupling circuit 4 and seriously interfere with the restoration of the data by receiver 9. As has been explained, when the transmission path 3 includes a satellite link, the unwanted echo signal may simultaneously include a non-delayed near echo generated between the local modem and the satellite link and a distant echo generated between the satellite link and the remote modem. These two types of echo are of substantially the same duration, being at most several tens of ms; but the distant echo has, in relation to the near echo, a delay which may vary, for example, between 220 and 630 ms.

To achieve economically the cancellation of an echo signal formed by a near echo and a distant echo it is possible to use a cancelling arrangement processing the data signal D and having the configuration shown in FIG. 1. As has been explained, this signal D, modified by the phase variations of the carrier, is complex and the echo-cancelling arrangement is designed to process complex signals. It will be assumed, for the sake of simplicity, that the signal received in the modem is sampled at the modulation rate H, which implies that the data signal D processed by the echo-cancelling arrangement is also sampled at rate H. It is, in fact, well known that, if, in order to cancel the echo signal the received signal has to be sampled with a sampling rate H' which is a multiple of H(H'=qH) so as to satisfy Shannon's theorem, it is sufficient to use q identical echo subcancellers, each operating separately at the sampling rate H, with a time shift of 1/(qH).

The echo-cancelling arrangement in FIG. 1 includes a near echo canceller 10 comprising in particular a memory 10-1 performing the function of a delay line, a memory 11 performing the function of a delay line, and a distant echo canceller 12 comprising in particular a memory 12-1 performing the function of a delay line. The three delay lines 10-1, 11 and 12-1 are arranged in cascade and receive the signal D.

The near echo canceller 10 comprises a calculation circuit 10-2 which forms the weighted sum of the samples of signal D, stored in delay line 10-1, with complex weighting coefficients stored in a memory 10-3. Delay line 10-1 produces a delay $\tau_1$ which is substantially equal to the maximum duration of the near echo. Delay line 11 produces a delay $\tau - \tau_1$ such that the samples of signal D arrive at the input of delay line 12-1 with a delay which is substantially equal to the delay $\tau$ of the distant echo. This delay $\tau$ is measured by any known method such as, for example, that described in the above-mentioned article by Weinstein or that described in the French Patent Application No. 82 22 124, and the information relating to the delay $\tau$ resulting from the measurement is assumed to be stored in a memory 13. The distant echo canceller 12 comprises a calculation circuit 12-2 which forms the weighted sum of the delayed samples of signal D, stored in the delay line 12-1, with complex weighting coefficients stored in memory 12-3. Delay line 12-1 produces a delay $\tau_2$ which is substantially equal to the maximum duration of the distant echo and which is of the same order of magnitude as $\tau_1$.

The near echo canceller 10 and the distant echo canceller 12 form transversal filters with complex coefficients whose output signals $\hat{\epsilon}_p$ and $\hat{\epsilon}_l$, calculated in the calculation circuits 10-2 and 12-2, are applied to an adder 14. The signal $\hat{\epsilon}_p + \hat{\epsilon}_l$ leaving adder 14 is applied to the (−) input of a difference circuit 15. This difference circuit 15 is inserted via its (+) input and its output into the receive path 2 between coupling circuit 4 and receiver 9. The weighting coefficients of near echo canceller 10 and distant echo canceller 12, which are stored in memories 10-3 and 12-3, have to be adjusted so that the signals $\hat{\epsilon}_p$ and $\hat{\epsilon}_l$ supplied by the transversal filters of these echo cancellers are practically equal to the near echo signal $\epsilon_p$ and the distant echo signal $\epsilon_l$ appearing in the receive path 2. The effect of this is that the signal $\epsilon_p + \epsilon_l$ resulting from the near and distant echoes is practically cancelled in the output signal from difference circuit 15.

The adjustment of the filter coefficients of the near and distant echo cancellers is generally effected by successive iterations on a basis of the gradient algorithm so as to minimize the mean square value of the output signal from difference circuit 15. However, with this method advocated in the above-mentioned article by Weinstein, the time needed for initialization of the coefficients when the arrangement is started up is necessarily long since the coefficients tend asymptotically towards their optimum values. The present invention provides a method permitting the rapid calculation of the coefficients of the near and distant echo cancellers and one which can be used during the starting-up of the echo-cancelling arrangement.

Figure 2:
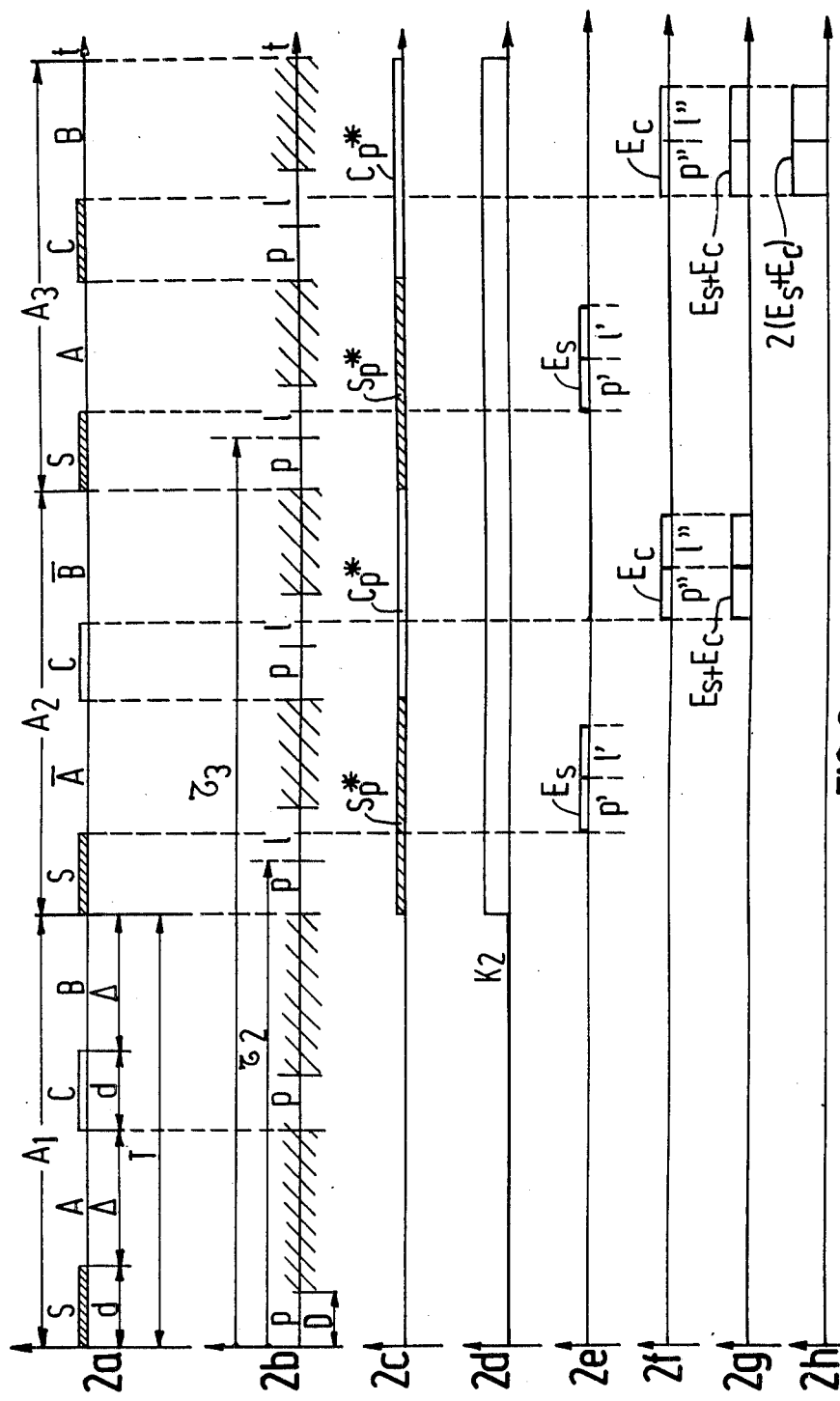
FIGS. 2a through 2h show time diagrams illustrating the method according to the invention.

In order, using the method according to the invention, to generate near and distant echoes to be used to calculate these coefficients, a baseband signal B is transmitted via transmit path 1 with the aid of a suitable data generator 5, which baseband signal B consists of at least two consecutive training sequences having the structure and properties which will be described with the aid of a time diagram 2a in FIG. 2. In this diagram, there are shown, for example, three training sequences $A_1$, $A_2$ and $A_3$ with the same duration T, transmitted successively starting at the originating instant t=0. Each sequence $A_1$, $A_2$ or $A_3$ comprises a pair of complementary sequences S and C, with the same duration d and each consisting of a certain number of bits occurring at the modulation rate H. For example, each sequence may consist of 64 bits occurring at a rate of 1600 Hz, corresponding to a duration d of 40 ms. These complementary S and C sequences have aperiodic autocorrelation functions with main lobes of the same sign and sidelobes substantially of the same absolute value and with opposite signs; the interesting property of this pair of complementary sequences S and C is that, if their aperiodic autocorrelation functions are added, the two main lobes will reinforce each other while the sidelobes practically eliminate each other.

It was assumed above, in order to concentrate thought, that the complementary sequences S and C formed a binary and therefore real signal. But it is also possible to use complementary S and C sequences forming a complex signal and possessing the same properties with regard to their aperiodic autocorrelation functions.

Each S or C sequence is followed by a time interval of variable duration $\Delta$ which is determined as a function of the measured delay $\tau$ of the distant echo, as will be explained with the aid of diagram 2b associated with diagram 2a. In diagram 2b the time intervals p are shown following the start of each of the S and C sequences in the training sequences $A_1$, $A_2$ and $A_3$. These time intervals p have a duration D over which, at most, the impulse response of the path of the near echo produced by a Dirac impulse occurring at the start of an S or C sequence extends. The time intervals $\Delta$ are determined so that the impulse response of the path of the distant echo produced by such a Dirac impulse at the start of the first sequence $A_1$, for example, occurs during the following sequences $A_2$ or $A_3$, in the time intervals l of duration D immediately following the time intervals p. Thus the distant echoes produced by Dirac impulses occurring at the start of the S and C sequences of the first sequence $A_1$ may occur in the intervals l of the second sequence $A_2$, with a delay $\tau = \tau_2$ in relation to the instant of occurrence of these Dirac impulses. The distant echoes produced by the Dirac impulses of the first sequence $A_1$ might also occur in the course of the time intervals $\tau$ in the third sequence $A_3$, with a delay $\tau = \tau_3$, or in the course of other following sequences which are not shown.

The practical determination of the duration $\Delta$ in accordance with the measured delay $\tau$ of the distant echo is performed in a device 16, which receives the information relating to the delay $\tau$ contained in memory 13 and which supplies data generator 5 with information characterizing the duration $\Delta$. Generator 5 is arranged to modify, as a function of that information, the durations $\Delta$ in the training sequences.

The operation of device 16 accords with the following considerations: the time interval $\Delta$ comprises a fixed part with a duration 2D equal to the sum of the duration of the intervals p and l and a variable part with a duration $\epsilon$ such that there results:

$$\Delta = 2D + \epsilon$$

It will be readily deduced from the indications applied to diagrams 2a and 2b that:

$$T = 2(d + 2D + \epsilon)$$

$$\tau = kT + D$$

(k = integer)

Depending on whether the distant echo resulting from a Dirac impulse at the start of the first sequence $A_1$ is in the second sequence $A_2$ or in the third sequence $A_3$ or in a fourth sequence $A_4$, not shown, the values $k=1$ or $k=2$ or $k=3$ are found.

On the other hand, the variable part $\epsilon$ of the time interval $\Delta$ must be determined with a step equal to the modulation interval, or $1/H$, where H is the modulation rate. It is therefore permissible to write:

$$\epsilon = m/H$$

(m = integer)

Using the above relations giving T, $\tau$ and $\epsilon$, we readily obtain:

$$\tau = 2k(d + 2D) + (2km/H) + D$$

Taking, for example,
for the duration of an S or C sequence: d = 40 ms,
for the duration of an interval p or l: D = 30 ms,
for the modulation rate: H = 1600 Hz,
we obtain for the delay $\tau$ expressed in ms:

$$\tau = 200\ k + 1.25\ km + 30 \quad (1)$$

For each measured delay $\tau$ the parameters k and m have to be chosen such that equation (1) is satisfied. Table I below lists the values of k to be chosen for several ranges of the possible values of the measured delay $\tau$. The corresponding range of the values of m is also given for each range of $\tau$.

TABLE I

| | | |
|---|---|---|
| 230 ≦ $\tau$ < 430 | k = 1 | 0 ≦ m < 160 |
| 430 ≦ $\tau$ < 630 | k = 2 | 0 ≦ m < 80 |
| 630 ≦ $\tau$ ≦ 780 | k = 3 | 0 ≦ m ≦ 40 |

For each value of the measured delay $\tau$ it is possible to obtain a value for m satisfying equation (1), making it possible to form the variable part $\epsilon$ of the time intervals $\Delta$, where $\epsilon = m/H$, and finally the time interval $\Delta$ itself.

It will be a simple matter for a person skilled in the art to conceive of a device 16 which, via logical methods and known calculating methods, makes it possible to find, corresponding to each measured delay $\tau$, a couple of values for k and m characterizing the duration of the time intervals $\Delta$. These two values characterizing this duration may be transmitted to data generator 5 for the transmission of suitable training sequences.

After the transmission of the first training sequence $A_1$ possessing the appropriate duration characteristic $\Delta$, processing of the received signal appearing at the receive access of coupling circuit 4 is carried out in accordance with the method according to the invention. This processing begins at the start of the training sequence in which the distant echo produced by the first training sequence $A_1$ appears. This start-of-processing sequence is $A_2$ or $A_3$ depending on whether $\tau = \tau_2$ or $\tau_3$ (i.e. k = 1 or 2). It will be assumed henceforth that processing begins at the start of the second training sequence $A_2$.

With the method according to the invention, such processing consists first of all in forming the correlation signal between the complex version of the received signal and a reference signal which consists either of the conjugate value $S_p^*$ of a sequence $S_p$ or of the conjugate value $C_p^*$ of a sequence $C_p$, the sequences $S_p$ and $C_p$ being respectively complementary S and C sequences which have been subjected to the phase variations $\Delta\phi$ of the carrier, i.e. the sequences supplied by circuit 6 in response to the S and C sequences. As shown by diagram 2c associated with diagram 2a, the reference signal is $S_p^*$ for the duration of transmission of an S sequence and the duration $\Delta$ immediately following this transmitted S sequence; the reference signal is $C_p^*$ for the duration of transmission of a C sequence and the duration $\Delta$ immediately following this transmitted C sequence. It may be observed that the reference signal thus formed is shown in diagram 2c only for the duration of the processing commencing in the example chosen at the start of the second sequence $A_2$.

The sequences $S_p$ and $C_p$ delivered by circuit 6 may be written:

$$S_p = S\ \exp(j2\pi f_c t)$$

$$C_p = C\ \exp(j2\pi f_c t)$$

where $f_c$ is the frequency of the transmit carrier and $2\pi f_c t$ represents the phase of this carrier, which is variable with time.

It can be shown that, if the phase of this carrier is the same at the start of each training sequence, the sequence $S_p$ and $C_p$, like the reference sequences $S_p^*$ and $C_p^*$, are complementary like the original sequences S and C, i.e., if their aperiodic autocorrelation functions are added, the two main lobes reinforce each other while the sidelobes practically eliminate each other. This phase condition of the carrier is ensured in FIG. 1 by a synchronizing signal $S_y$, produced in generator 5, in order to reset to a fixed value $\phi_0$, at the start of each training sequence, the phase of the sequences $S_p$ and $C_p$ supplied by circuit 6.

The above-mentioned processing can be carried out, for example, as shown in FIG. 1. The received signal is taken from receive path 2 and applied to a circuit 50 which comprises a 90° phase-shifter in order to form the imaginary component of the received signal, circuit 50 delivering a complex signal consisting of the received signal as real component and this imaginary component. The received complex signal thus formed is applied to a sampling circuit 17 to be sampled at the sampling rate H. The received signal thus sampled is applied to a routing circuit 19 which is operated by a control signal $K_1$ so as to occupy its position s during the time intervals $d + \Delta$ in which the reference signal is a sequence $S_p^*$ and to occupy its position c during the time intervals $d + \Delta$ in which the reference signal is a sequence $C_p^*$. The control signal $K_1$ is produced by a control circuit 18 on the one hand starting from the modulation rate H and on the other starting from the information characterizing the variable duration $\Delta$.

Depending on whether routing circuit 19 is in its position s or its position c, the sample received complex signal is applied to shift register 20 or 21, both of which receive shift pulses of frequency H. These registers have a number n of elements corresponding to the duration d of a transmitted S or C sequence, thus n = 64 elements for d = 40 ms and H = 1600 Hz. On the other hand, the n elements of the reference sequences $S_p*$ and $C_p*$ are stored respectively in memories 22 and 23. A control signal $K_2$ shown in diagram 2d makes it possible to supply in parallel at the outputs of memories 22 and 23 the n elements of the sequences $S_p*$ and $C_p*$ during a certain number of training sequences following the first sequence $A_1$. With the signal $K_2$ in diagram 2d, these bits appear during the two training sequences $A_2$ and $A_3$. The control signal $K_2$ is produced in control circuit 18.

The elements of the sequence $S_p*$ appearing at the outputs of memory 22 and the complex samples of the received signal appearing in parallel at the outputs of register 20 are applied to a calculation circuit 24 which calculates the sum of the products of these elements and these samples so as to form the correlation signal $E_s$. A correlation signal $E_c$ is calculated in the same way by a calculation circuit 25 from the elements of the sequence $C_p*$ appearing at the outputs of memory 23 and the complex samples of the received signal appearing at the outputs of register 21.

It will be readily appreciated that the correlation signals $E_s$ and $E_c$ could also be calculated by means of a single calculation device such as 24 jointly with a shift register 20 permanently connected to the output of sampling circuit 17 and to a memory 22 alternately supplying a sequence $S_p*$ and a sequence $C_p*$. The calculation device will then alternately supply the signal $E_s$ and the signal $E_c$ which should be distributed over two paths, as in FIG. 1.

Assuming a situation in which no signal is transmitted during the time intervals $\Delta$ in the training sequences, diagrams 2e and 2f represent the time intervals during which the contribution of the near and distant echoes to the correlation signals $E_s$ and $E_c$ appears. According to diagram 2e, the contribution of the near echo to the signal $E_s$ appears during a time interval p' with a duration D following each S sequence transmitted as from the second training sequence A2; the contribution of the distant echo to the signal $E_s$ appears during a time interval l' with a duration D following each time interval p'. According to diagram 2f, the contribution of the near echo to the signal $E_c$ appears during a time interval p" with a duration D following each C sequence transmitted as from the second training sequence A2; the contribution of the distant echo to the signal $E_c$ appears during a time interval l" with a duration D following each time interval p".

The correlation signal $E_s$ is delayed by a duration $d + \Delta$, half of the duration T of a training sequence, with the aid of a delay circuit 26 which receives from circuit 16 the information on the variable duration $\Delta$ and which produces the delay $d + \Delta$ varying as a function of $\Delta$. The delayed correlation signal $E_s$ and the correlation signal $E_c$ are added with the aid of an adder 27. The result is the sum signal $E_s + E_c$ shown in the diagram 2g, which signal occurs during the same time intervals p" and l" as signal $E_c$ in diagram 2f. Thanks to the complementarity property of reference sequences $S_p*$ and $C_p*$ whose summed aperiodic autocorrelation functions form a function of which only the main lobe is not zero, the sum signal $E_s + E_c$ represents, during the time intervals p", the impulse response of the path of the near echo and, during time intervals l", the impulse response of the path of the distant echo excluding the path producing the delay $\tau$. Since in fact the sum signal $E_s + E_c$ is sampled at the sampling rate H, the samples of the impulse response of the near echo path, i.e. the coefficients of the near echo canceller in series, are obtained during the time intervals p", and the samples of the impulse response of the distant echo path, i.e. the coefficients of the distant echo canceller in series, are obtained during the time intervals l".

In the case considered hitherto, in which no signal is transmitted during the time intervals $\Delta$, it would be possible to transmit only the two training sequences $A_1$ and $A_2$ and to extract the coefficients of the two echo cancellers from the signal $E_s + E_c$ formed during the sequence $A_2$ with the aid of suitable time windows. But it may be useful, in order to improve the signal-to-noise ratio, to accumulate the signal $E_s + E_c$ during several periods T of the training signal before extracting the coefficients of the echo cancellers from it. Diagram 2h, for example, shows the signal 2 ($E_s + E_c$) resulting from the accumulation of the $E_s + E_c$ signal formed during the two training sequences $A_2$ and $A_3$. In this case it is possible to obtain the coefficients of the near echo canceller in series during a time window coinciding with the time interval p" in the sequence $A_3$, and to obtain the coefficients of the distant echo canceller in series during a time window coinciding with the time interval l" in the sequence $A_3$.

The operation of accumulating the sum signal $E_s + E_c$ is carried out in FIG. 1 with the aid of an accumulator 28 connected to the output of adder 27 and achieved with the aid of an adder 29 and a delay circuit 30 arranged as shown in the figure. Circuit 30 produces a delay equal to the period T of the training signal and is controlled by the variable duration $\Delta$ since T is a function of $\Delta$. The accumulation is effected during a number of periods T defined by the signal $K_2$, e.g. two periods in the case illustrated by the diagrams in FIG. 2.

The output of accumulator 28 is connected on the one hand to coefficient memory 10-3 of the near echo canceller via a gate 31 shown in the form of an interrupter contact and on the other hand to coefficient memory 12-3 of the distant echo canceller via a gate 32. Gates 31 and 32 make it possible to obtain time windows during which the coefficients of the near and distant echo cancellers are extracted. These gates 31 and 32 are controlled respectively by the control signals $K_3$ and $K_4$ generated by control circuit 18 and making these gates conducting respectively during the time intervals p" and l" of the sequence $A_3$.

The case considered so far is that in which no signal is transmitted during the time intervals $\Delta$ in the training sequences. But satellite communications are effected by time division and in many cases it is impossible to tolerate such periods of silence, whose duration $\Delta$ depends on the particular connection. It is therefore necessary to transmit fill-in signals during the time intervals $\Delta$. However, the correlation signals $E_s + E_c$ then comprise terms depending on these fill-in signals, resulting in parasitic signals in the time windows during which the coefficients of the near and distant echo cancellers are extracted.

These parasitic signals can be avoided by using fill-in signals such that, in two successive training sequences, the fill-in signals for the two corresponding time intervals $\Delta$ add up to zero. For example, as diagram 2a shows, the first and second time intervals $\Delta$ in the first sequence $A_1$ can be filled respectively by any signals A and B. But the first and second time intervals in the second sequence $A_2$ have then to be filled by signals $\overline{A}$ and $\overline{B}$ such that $A + \overline{A} = 0$ and $B + \overline{B} = 0$. The fill-in signals A and B will be used for the third sequence $A_3$ and so on. Signals A and B can be identical and formed very simply, for example, by an alternating sequence of +1 and −1.

With these fill-in signals, A, $\overline{A}$, B and $\overline{B}$, parasitic correlation terms are obtained which are superimposed on the useful correlation terms and which are:

during the duration of the second sequence $A_2$, the result of the correlations of A with $S_p^*$ and of B with $C_p^*$;

during the duration of the third sequence $A_3$, the result of the correlations of $\overline{A}$ with $S_p^*$ and of $\overline{B}$ with $C_p^*$.

If the result of the correlations performed during the duration of these two sequences $A_2$ and $A_3$ is accumulated the parasitic correlation terms are cancelled out and in the time windows defined by the time intervals p″ and l″ of sequence $A_3$, the coefficients of the near and distant echo cancellers are obtained free of the parasitic signals brought about by the fill-in signals.

In the event that fill-in signals as defined above are used, the period of the training signal is 2T, i.e. twice the duration of a sequence comprising the fill-in signals A, B or $\overline{A}$, $\overline{B}$. To improve the signal-to-noise ratio, therefore, the result of the correlations can be accumulated during a duration which is a multiple of 2T, i.e. an even multiple of the duration T of a sequence.

The method according to the invention and the corresponding apparatus in FIG. 1 have been described for the case that the echo-cancelling arrangement processes the signal D with a sample rate equal to the modulation rate H. As has been indicated above, it may be decided to have the echo-cancelling arrangement operate with a signal D sampled at a sample rate H′=qH, i.e. a multiple of H. In this case the echo-cancelling arrangement is made up of q branches each operating at the sampling rate H on samples of the signal D distributed in time and each composed like the arrangement in FIG. 1, i.e. of a near echo sub-canceller similar to 10, of a delay line similar to 11 and of a distant echo sub-canceller similar to 12. In order to initialize the coefficients of the q near echo sub-cancellers and the q distant echo sub-cancellers, it is necessary, using the method according to the invention, to sample the received signal with a sampling rate H′=qH, then to distribute as a function of time the samples of the received signal over q initialization arrangements each similar to the initialization arrangement formed by elements 19 to 32. Each of these initialization arrangements operates at the sample rate H to provide the coefficients of the near and distant echo sub-cancellers of a branch.

The method according to the invention such as it has been described until now makes it possible to obtain in a single step the complex coefficients of the near and distant echo cancellers, thanks to the use of the complex version of the received signal to form the correlation signals $E_s$ and $E_c$. However, with a variant of the method according to the invention, it is possible to obtain complex coefficients without forming the complex version of the received signal, thus rendering it possible to avoid using a circuit 50 with a 90° phase-shifter.

With this variant, the initialization of the coefficients is effected in two steps. In the first step the chosen succession of training sequences forming a baseband signal B is generated with the aid of generator 5. In circuit 6, this signal B is subjected to the phase variations $\Delta\phi$ of the in-phase transmit carrier so as to form the signal D. By using the received signal directly (i.e. by omitting circuit 50), complex coefficients $K_{1p}$ are obtained, exactly as has been explained, for the near echo canceller and complex coefficients $K_{1l}$ are obtained for the distant echo canceller. In the second step the same baseband signal B is generated with the aid of generator 5. However, this signal B is subjected in circuit 6 to the phase variations $\Delta\phi$ of the quadrature-phase transmit carrier so as to form the signal −jD. By using the received signal directly and by using the same reference signals $S_p^*$ and $C_p^*$ as in the first stage to form the correlation signals $E_s$ and $E_c$, complex coefficients $K_{2p}$ are obtained for the near echo canceller and complex coefficients $K_{2l}$ for the distant echo canceller. The coefficients $K_p$ and $K_l$ to be used for the near and distant echo cancellers are obtained by summing the coefficients formed at the end of the two steps, namely:

$$\begin{cases} K_p = K_{1p} + K_{2p} \\ K_l = K_{1l} + K_{2l} \end{cases}$$

The advantage of omitting a 90° phase-shifter in forming circuit 50 in this variant is offset by the fact that the coefficient-initialization time is doubled.

What is claimed is:

1. For use in a data transceiver having a transmit path and a receive path and which includes an echo-canceller arrangement for cancelling an echo occurring in the receive path in response to transmission by said transceiver of a phase modulated digital signal applied to the transmit path, said echo comprising a substantially undelayed near echo signal and a delayed echo signal; said echo-cancelling arrangement operating at a given sample rate and comprising a near-echo canceller to which the transmitted signal is supplied and a distant echo canceller which meausres a delay $\tau$ of the distant echo and to which the transmitted signal is supplied with a delay substantially equal to the measured distant echo delay $\tau$, the near and distant echo cancellers each comprising a filter having adjustable weighting coefficients; a method for initializing the filter coefficients of the near and distant echo cancellers, comprising the steps of:

(a) application to and transmission by the transmit path of the transceiver of a digital training signal D comprising at least two consecutive training sequences each of which includes a pair of complementary sequences S and C of the same duration d, said sequences S and C having aperiodic autocorrelation functions whose main lobes have the same sign and whose sidelobes have substantially the same absolute value and opposite signals, each S and C sequence being followed by a time interval of a variable duration $\Delta$ determined from the measured distant echo delay $\tau$ so that the distant echo signal produced in response to an S or C sequence in each training sequence occurs during a following training sequence immediately after occurrence of a near echo signal in the receive path of the transceiver in response to one of the S and C sequences in the following training sequence;

(b) during each training sequence transmitted after the first training sequence.

deriving correlation signals $E_S$ and $E_C$ respectively representing the correlation, between an echo signal received in response to a transmitted S sequence and an echo signal received in response to a transmitted C sequence, respectively, which echo signals are sampled at said sample rate, and respective reference sequences $S_p^*$ and $S_c^*$; the reference sequence $S_p^*$ representing, during said transmitted S sequence and the following time interval $\Delta$, the conjugate value of said training signal D during said transmitted S sequence; and the reference sequence $S_c^*$ representing, during said transmitted C sequence and the following time interval $\Delta$, the conjugate value of said training signal D during said transmitted C sequence;

delaying the correlation signal $E_S$ by a delay $d+\Delta$, deriving the sum of said delayed correlation signal $E_S$ and said correlation signal $E_C$, said sum of the correlation signals serially representing during a first interval thereof an impulse response of the echo path for application to the near echo canceller and serially representing during a second interval thereof an impulse response of the echo path for application to the distant echo canceller; and (c) routing said sum of the correlation signals to the near echo canceller during said first interval of said sum of the correlation signals to control formation of the filter coefficients of the near echo canceller and to the distant echo canceller during said second interval of said sum of the correlation signals to control formation of the filter coefficients of the distant echo canceller.

2. A method as claimed in claim 1, in which a sufficient number of training sequences are transmitted so that each of the correlation signals $E_C$ and $E_S$ are derived during at least two transmitted training sequences, the signals $E_C$ and $E_S$ so derived during at least two transmitted sequences being accumulated and thereafter summed to form a sum signal which is switched to the near echo canceller and to the distant echo canceller to control formation of the filter coefficients thereof.

3. A method as claimed in claim 2, in which fill-in signals are transmitted by the transceiver during the time intervals $\Delta$ in the transmitted training sequences, fill-in signals A and A' being transmitted in two consecutive training sequences during the time intervals $\Delta$ following the two S sequences therein, and fill-in signals B and B' being transmitted in said two consecutive training sequences during the time intervals $\Delta$ following the two C sequences therein, the fill-in signals being such that $A+A'=0$ and $B+B'=0$.

4. A method as claimed in claim 1, wherein the correlation signals $E_S$ and $E_C$ respectively represent the correlation between the complex form of the echo received in response to a transmitted S sequence and the echo received in response to a transmitted C sequence, respectively, and said reference signals $S_p^*$ and $S_c^*$, respectively.

5. In a data transceiver having a transmit path and a receive path and which includes an echo-cancelling arrangement for cancelling an echo occurring in the receive path in response to transmission by said transceiver of a phase modulated digital signal applied to the transmit path, said echo comprising a substantially undelayed near echo signal and a delayed distant echo signal; said echo-cancelling arrangement operating at a given sample rate and comprising a near echo canceller to which the transmitted signal is supplied and a distant echo canceller which measures a delay $\tau$ of the distant echo and to which the transmitted signal is supplied with a delay substantially equal to the measured distant echo delay $\tau$, the near and distant echo cancellers each comprising a filter having adjustable weighting coefficients; apparatus for initializing the filter coefficients of the near and distant echo cancellers, said apparatus comprising:

a data source connected to the transmit path of the transceiver for transmitting a digital training signal D comprising at least two consecutive training sequences each of which includes a pair of complementary sequences S and C of the same duration d, the sequences S and C having aperiodic autocorrelation functions whose main lobes have the same sign and whose side lobes have substantially the same absolute value and opposite signs, each S and C sequence being followed by a time interval of a variable duration $\Delta$;

calculating circuit means connected to each of said echo cancellers for determining said time interval $\Delta$ from the measured distant echo delay $\tau$ and for applying a signal corresponding to the time interval $\Delta$ to said data source, the value of the time interval $\Delta$ being such that the distant echo signal produced in response to an S or C sequence in each training sequence occurs during a following training sequence immediately after occurrence of a near echo signal in the receive path of the transceiver in response to one of the S and C sequences in the following training sequence;

correlating circuit means connected to the receive path of the transceiver and to said calculating circuit means for deriving, during each transmitted training sequence following the first training sequence, correlation signals $E_S$ and $E_C$ respectively representing the correlation between a signal derived from the echo signal received in response to a transmitted S sequence and a transmitted C sequence, respectively, and which is sampled at said sample rate, and respective reference sequences $S_p^*$ and $S_c^*$; the reference sequence $S_p^*$ representing, during said transmitted S sequence and the following time interval $\Delta$, the conjugate value of said training signal D during the transmitted S sequence; the reference sequence $S_c^*$ representing, during said transmitted C sequence and the following time interval $\Delta$, the conjugate value of said training signal D during the transmitted C sequence;

circuit means connected to said correlating circuit means for applying a delay $d+\Delta$ to the correlation signal $E_S$ and deriving the sum of the delayed correlation signal $E_S$ and the correlation signal $E_C$, said sum of the correlation signals serially representing during a first interval thereof an impulse response for the echo path for application to the near echo canceller, and serially representing during a second interval thereof an impulse response of the echo path for application to the distant echo canceller;

and circuit means connected to said sum deriving circuit means for routing the sum of the correlation signals produced thereby to the near echo canceller during said first interval of said sum of the correlation signals and to the distant echo canceller during said second interval of said sum of the correlation signals, each of said first and second intervals of said sum of the correlation signals following transmission of a C sequence in the transmit path of said transceiver;

whereby the sums of the correlation signals supplied to the near and distant echo cancellers control formation of the coefficients thereof for effecting echo signal cancellation.

6. Apparatus in accordance with claim 5, further comprising circuit means connected to said sum deriving circuit means for accumulating sum signals produced thereby during a predetermined number of training signal sequences and supplying accumulated sum signals to said routing circuit means, the accumulated sum signals constituting the signals for routing to the near and distant echo cancellers.

* * * * *

UNITED STATES PATENT AND TRADEMARK OFFICE
CERTIFICATE OF CORRECTION

PATENT NO. : 4,645,884

DATED : February 24, 1987

INVENTOR(S) : Bahman Barazeche et al

It is certified that error appears in the above-identified patent and that said Letters Patent is hereby corrected as shown below:

Column 12, line 53:

Claim 1. line 27    change "signals" to --signs--.

Signed and Sealed this

Fifteenth Day of October, 1991

Attest:

HARRY F. MANBECK, JR.

*Attesting Officer*    Commissioner of Patents and Trademarks